United States Patent
Abdulkader et al.

(10) Patent No.: US 9,014,477 B2
(45) Date of Patent: Apr. 21, 2015

(54) METHOD AND APPARATUS FOR AUTOMATICALLY IDENTIFYING CHARACTER SEGMENTS FOR CHARACTER RECOGNITION

(75) Inventors: Ahmad Abdulkader, San Jose, CA (US); Hussein Khalid Al-Omari, Amman (JO); Mohammad Sulaiman Khorsheed, Riyadh (SA)

(73) Assignee: King Abdulaziz City for Science and Technology (KACST), Riyadh (SA)

( * ) Notice: Subject to any disclaimer, the term of this patent is extended or adjusted under 35 U.S.C. 154(b) by 357 days.

(21) Appl. No.: 13/282,465

(22) Filed: Oct. 27, 2011

(65) Prior Publication Data

US 2013/0108159 A1     May 2, 2013

(51) Int. Cl.
*G06K 9/34*     (2006.01)

(52) U.S. Cl.
CPC ..................... *G06K 9/34* (2013.01)

(58) Field of Classification Search
USPC .......................................................... 382/177
See application file for complete search history.

(56) References Cited

U.S. PATENT DOCUMENTS

| | | | |
|---|---|---|---|
| 5,933,525 A * | 8/1999 | Makhoul et al. | 382/186 |
| 5,991,439 A * | 11/1999 | Tanaka et al. | 382/178 |
| 6,333,994 B1 * | 12/2001 | Perrone et al. | 382/186 |
| 2005/0100214 A1 * | 5/2005 | Zhang et al. | 382/179 |
| 2006/0193518 A1 * | 8/2006 | Dong | 382/186 |
| 2007/0014475 A1 * | 1/2007 | Prymus et al. | 382/186 |
| 2007/0025618 A1 * | 2/2007 | Lin | 382/186 |
| 2008/0123940 A1 * | 5/2008 | Kundu et al. | 382/159 |
| 2009/0136136 A1 * | 5/2009 | Mori et al. | 382/187 |
| 2010/0080462 A1 * | 4/2010 | Miljanic et al. | 382/186 |
| 2010/0272361 A1 * | 10/2010 | Khorsheed et al. | 382/187 |
| 2011/0007964 A1 * | 1/2011 | Saund et al. | 382/162 |
| 2012/0014601 A1 * | 1/2012 | Jiang et al. | 382/173 |

OTHER PUBLICATIONS

Blumenstein et al. "A New Segmentation Algorithm for Handwritten Word recognition" International Joint Conference on Neural Networks, 1999. IJCNN '99. vol. 4, pp. 2893-2898 Jul. 1999.*

* cited by examiner

*Primary Examiner* — Jingge Wu
(74) *Attorney, Agent, or Firm* — Timberline Patent Law Group PLLC

(57) ABSTRACT

A method and apparatus for automatically identifying character segments for character recognition is provided. The method involves receiving a plurality of words and a ground truth corresponding to each word of the plurality of words. The plurality of words may be received in a cursive script. Each word of the plurality of words is segmented into one or more character segments based on the ground truth corresponding to each word. Thereafter, the segmentation of each word is refined by iteratively re-segmenting each word based on one or more similar character segments.

16 Claims, 4 Drawing Sheets

500
METHOD AND APPARATUS FOR AUTOMATICALLY IDENTIFYING CHARACTER SEGMENTS FOR CHARACTER RECOGNITION

FIELD OF THE INVENTION

The invention generally relates to a method and apparatus for automatically identifying character segments for character recognition. More specifically, the invention relates to a method and apparatus for training a classifier to automatically identify character segments for character recognition based on one or more of a word level and a line level ground truth.

BACKGROUND OF THE INVENTION

Automatic conversion of scanned documents into editable and searchable text requires use of accurate and robust Optical Character Recognition (OCR) systems. OCR systems involve recognition of text from scanned images by segmenting an input image of the text into characters. To recognize text from scanned images, an OCR system is initially trained with sample images of characters and their corresponding ground truths. Upon continuous training of an OCR system to recognize the text in a script, the OCR system learns to identify different characters in the text.

OCR systems for non-cursive scripts, such as for English text have reached a high level of accuracy. One of the main reasons for this high level of accuracy is the ability to automatically preprocess non-cursive scripts down to isolated characters to provide as input to the OCR systems. Each character in a non-cursive script can be isolated due to the inherent characteristic of non-cursive scripts to be non-touching. Once each character is isolated, a corresponding character level ground truth may be provided in order to train the OCR system.

However, with cursive scripts such as an Arabic script, isolating individual characters in order to train an OCR engine is complex. This is due to the touching nature of characters written in Arabic script. Additionally, Arabic text may include diacritics, such as dots and accent marks placed above or below a letter to indicate the pronunciation of the letter. This inhibits known preprocessing techniques used by OCR systems designed for recognizing non-cursive text from accurately processing the Arabic text. Further, many Arabic letters include three or four shapes depending on whether the letter is placed at the beginning of a word, at the middle of the word, at the end of the word, or as a standalone letter. These characteristics of Arabic text make it difficult to automatically segment Arabic text into individual characters.

Currently, to train an OCR engine for recognizing Arabic text, individual characters of a word in the Arabic text need to be manually demarcated and the corresponding ground truths entered for each demarcated character. When a large set of documents are used to train an OCR engine, the manual demarcation of the characters in a word and the subsequent entering of the ground truth for each character is tedious and error prone.

Therefore, there is a need for a method and apparatus for automatically identifying character segments for character recognition based on one or more of a word level and a line level ground truth.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
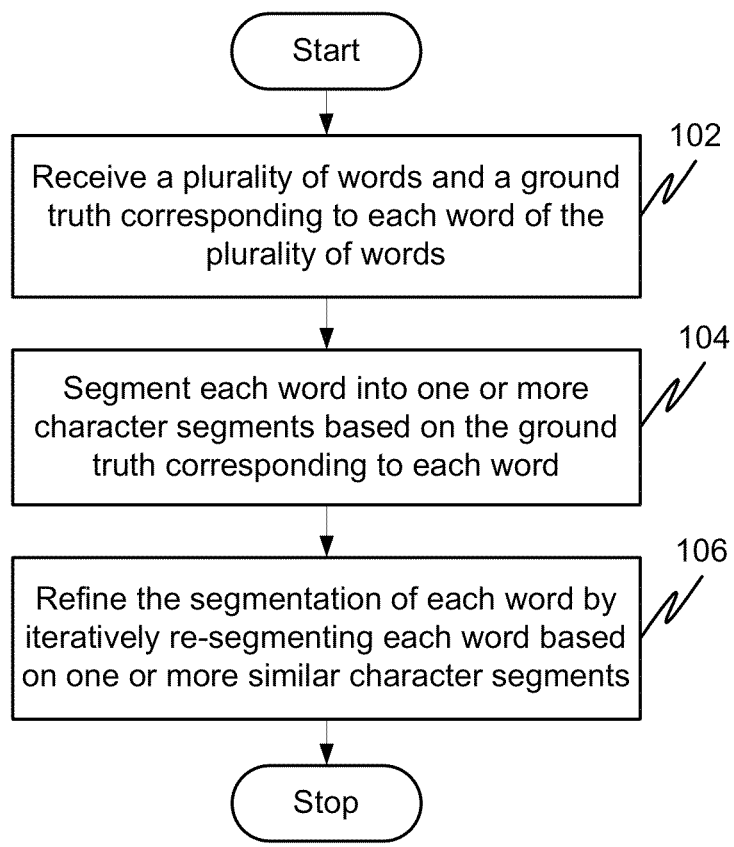
FIG. 1 illustrates a flow diagram of a method of automatically identifying character segments for character recognition in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and apparatus components related to automatically identifying character segments for character recognition. Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional transaction-clients and unique stored program instructions that control the one or more transaction-clients to implement, in conjunction with certain non-transaction-client circuits, some, most, or all of the functions of a method and apparatus for automatically identifying character segments for character recognition. The non-transaction-client circuits may include, but are not limited to, a radio receiver, a radio transmitter, signal drivers, clock circuits, power source circuits, and user input devices. As such, these functions may be interpreted as steps of methods for segmenting an image for recognizing text in the image. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to various embodiments, the invention provides a method and apparatus for automatically identifying character segments for character recognition. The method involves receiving a plurality of words and a ground truth corresponding to each word of the plurality of words. Each word of the plurality of words is segmented into one or more character segments based on the ground truth corresponding to each word. Thereafter, the segmentation of each word is refined by iteratively re-segmenting each word based on one or more similar character segments.

FIG. 1 illustrates a flow diagram of a method of automatically identifying character segments for character recognition in accordance with an embodiment of the invention. The method involves receiving a plurality of words and a ground truth corresponding to each word of the plurality of words at step 102. In an embodiment, the plurality of words may correspond to a line of text and a ground truth for the entire line of text may be received. It will be apparent to a person skilled in the art that the plurality of words may correspond to a paragraph, a zone in a page, a page, or multiple pages without deviating from the scope of the invention. The plurality of words may be in a cursive script. For example, the plurality of words may be in Arabic script, Farsi script, Kurdish script, etc.

At step 104, each word of the plurality of words is automatically segmented into one or more character segments (hereinafter referred to as "character segments") based on the ground truth corresponding to each word. A word is segmented into character segments based on the number of characters indicated by the ground truth of the word. For example, if a ground truth of a word indicates that there are four characters in the word, then the word is divided into four segments. The segmentation of a word into the character segments represents boundaries for the character segments within the word. In an embodiment, a word may be segmented by randomly dividing the word into character segments based on the number of characters indicated by the ground truth of the word. In another embodiment, a word may be segmented by dividing the word into character segments based on an average character width associated with each character in the word. An average character width for a particular character may be determined by analyzing a document corpus and averaging the width of all occurrences of the particular character. It will be apparent to a person skilled in the art that other methods to determine character width may also be employed without deviating from the scope of the invention.

The segmentation of each word into its constituent character segments randomly or based on average character width may not be accurate. This may be due to noise associated with each character segment. The noise may correspond to one or more parts of adjacent character segments within a segment associated with a character segment. The noise may also include foreign segments within the character segment. These foreign segments may be quantization noise from imaging light sensors, dirt on imaging device optics, ink spatters, and toner smudges.

To minimize noise associated with the character segments of a word, the segmentation of each word is automatically refined at step 106 by iteratively re-segmenting each word by comparing the character segments with one or more similar character segments (hereinafter referred to as "similar character segments"). To determine similar character segments, the ground truths of the character segments of a word are compared with ground truths of other character segments in the plurality of words and in a set of pre-saved character segments. If two ground truths are identical, then the character segments associated with the two ground truths are considered to be similar character segments. On comparing similar character segments, the segmentation of each character segment in the word is refined. Refining the segmentation of each word of the plurality of words includes determining a plurality of horizontal boundaries and a plurality of vertical boundaries for the character segments of each word. The plurality of horizontal boundaries and the plurality of vertical boundaries of the character segments of each word are then iteratively modified by comparing the character segments of each word with similar character segments over multiple iterations. Refining the character segments over multiple iterations eliminates noise associated with character segments as will be explained in conjunction with FIG. 2a to FIG. 2c.

Further, the character segments associated with the plurality of words along with the similar character segments associated with the plurality of words may be stored and added to the set of pre-saved character segments. The character segments along with the similar character segments may be used for subsequent iterations for refining the segmentation of each word of the plurality of words. Here, the set of pre-saved character segments is a dynamically growing set of character segments as character segments along with similar character segments are added to the set of pre-saved character segments after each iteration.

Figure 2A:
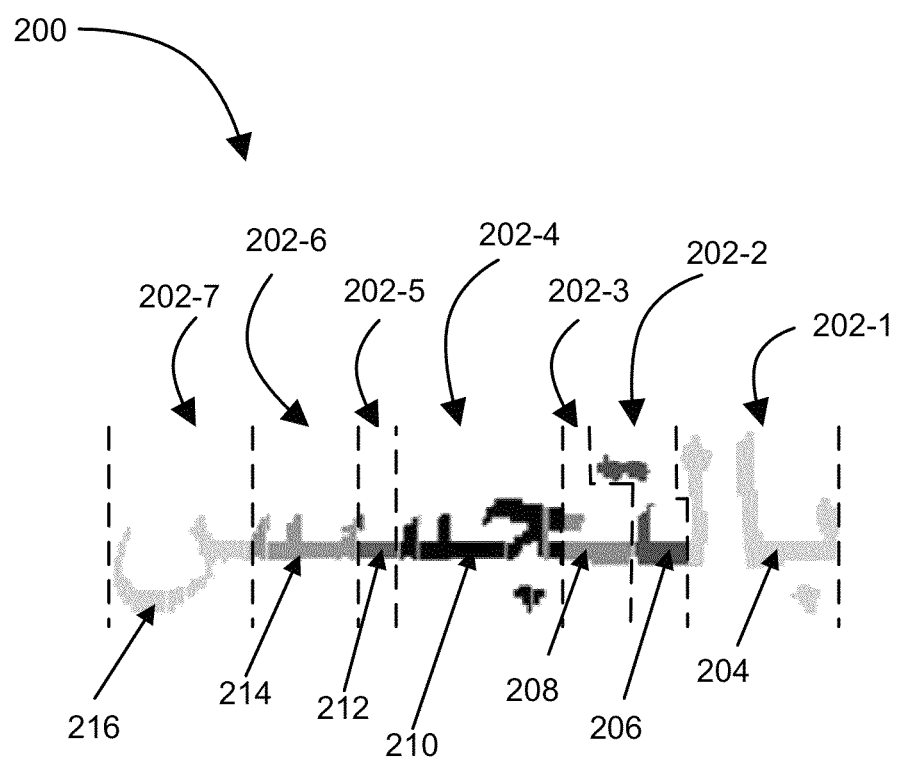
FIG. 2a to FIG. 2c illustrate a schematic diagram depicting segmentation of a word in Arabic script into character segments across multiple iterations, in accordance with an embodiment of the invention.
Figure 2B:
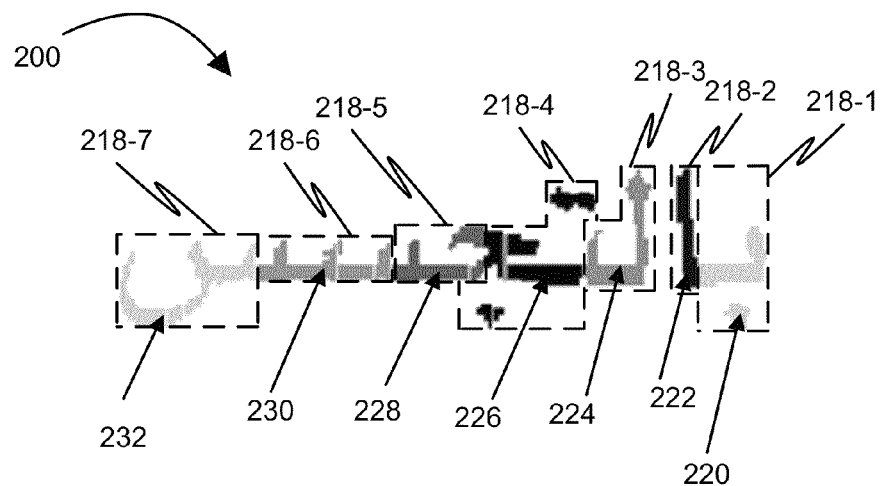
Figure 2C:
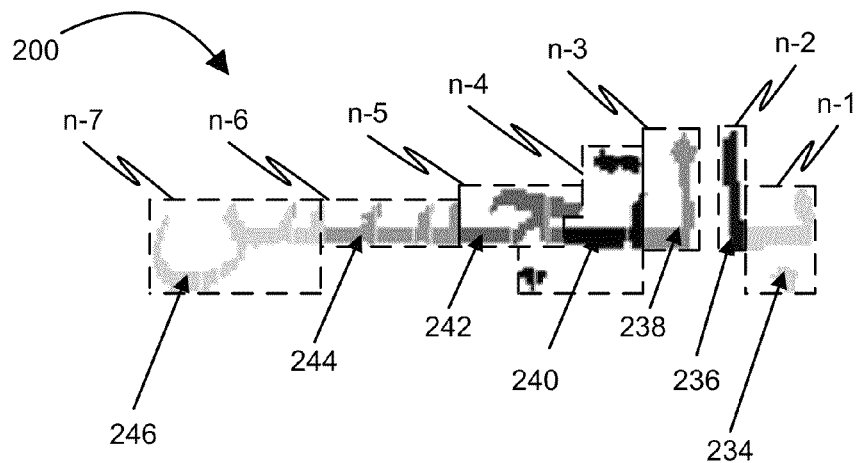

FIG. 2a to FIG. 2c exemplarily illustrates a word 200 in Arabic script iteratively segmented into one or more character segments. Initially, word 200 is segmented randomly or based on average character width into a number of segments based on number of characters indicated by a ground truth of word 200. In FIG. 2a, if the ground truth of word 200 indicates word 200 is made up of seven characters, then word 200 is segmented randomly or based on average character width into seven segments such as a segment 202-1, a segment 202-2, a segment 202-3, a segment 202-4, a segment 202-5, a segment 202-6, and a segment 202-7 (hereinafter referred to as segments 202-1 to 202-7). Segments 202-1 to 202-7 define boundaries for a character segment 204, a character segment 206, a character segment 208, a character segment 210, a character segment 212, a character segment 214, and a character segment 216 (hereinafter referred to as character segments 204-216) respectively.

Thereafter, the segmentation of character segments 204-216 are refined by iteratively comparing character segments 204-216 with one or more similar character segments (hereinafter referred to as similar character segments). In this case, segments 202-1 to 202-7 are refined to a segment 218-1, a segment 218-2, a segment 218-3, a segment 218-4, a segment 218-5, a segment 218-6, and a segment 218-7 (hereinafter referred to as segments 218-1 to 218-7) respectively based on the comparison as indicated in FIG. 2b. In order to determine similar character segments, ground truths of character segments 204-216 are compared with ground truths of other character segments from the plurality of words and the set of pre-saved character segments. If two ground truths are identical, then the character segments associated with the two ground truths are considered to be similar character segments.

Upon comparing character segments 204-216 with the similar character segments, a plurality of horizontal boundaries and a plurality of vertical boundaries are determined for each of character segments 204-216. The plurality of horizontal boundaries and the plurality of vertical boundaries for each of character segments 204-216 are indicated as segments 218-1 to 218-7 in FIG. 2b. Therefore, by refining the segmentation of word 200 based on the comparison, character segments 204-216 are refined to a character segment 220, a character segment 222, a character segment 224, a character segment 226, a character segment 228, a character segment 230, and a character segment 232 (hereinafter referred to as character segments 220-232) respectively. Refining character segments 204-216 to character segments 220-232 eliminates parts of one or more adjacent characters in character segments 204-216, thereby reducing noise present in character segments 204-216.

Thereafter, character segments 204-216 along with the similar character segments corresponding to character segments 204-216 may be stored in the set of pre-saved character segments. The stored character segments along with the similar character segments may then be used for subsequent iterations for refining segmentation of the plurality of words.

Similarly, each word of the plurality of words is compared with similar characters segments over multiple iterations and the segmentation of each word is refined at each iteration. Referring now to FIG. 2c, an $n^{th}$ iteration indicating the segmentation of word 200 is illustrated. In this case, segments 218-1 to 218-7 of FIG. 2b are refined to a segment n-1, a segment n-2, a segment n-3, a segment n-4, a segment n-5, a segment n-6, and a segment n-7 (hereinafter referred to as segments n-1 to n-7) based on the comparison as indicated in FIG. 2c. On refining the segmentation of word 200 based on the comparison, in the $n^{th}$ iteration character segments 220-232 are refined to a character segment 234, a character segment 236, a character segment 238, a character segment 240, a character segment 242, a character segment 244, and a character segment 246 (hereinafter referred to as character segments 234-246) respectively.

Figure 3:
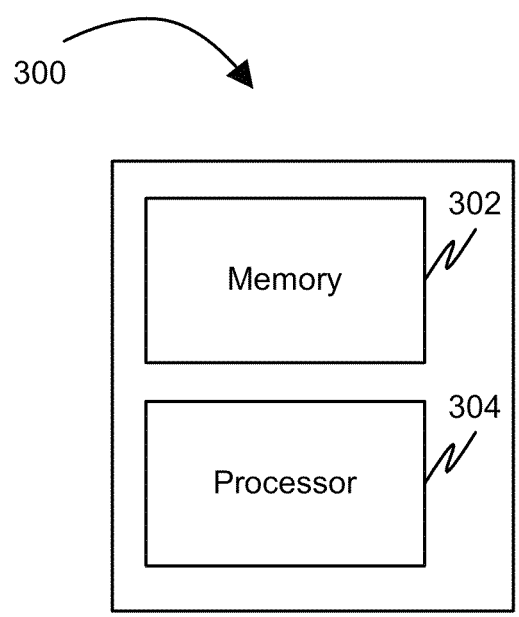
FIG. 3 illustrates an apparatus for automatically identifying character segments for character recognition in accordance with an embodiment of the invention.

FIG. 3 illustrates an apparatus 300 for automatically identifying character segments for character recognition in accordance with an embodiment of the invention. Apparatus 300 includes a memory 302 and a processor 304 coupled to memory 302.

Processor 304 is configured to receive a plurality of words and a ground truth corresponding to each word of the plurality of words. In an embodiment, the plurality of words may correspond to a line of text and a ground truth for the entire line of text may be received. It will be apparent to a person skilled in the art that the plurality of words may correspond to a paragraph, a zone in a page, a page, or multiple pages without deviating from the scope of the invention. The plurality of words may be in a cursive script.

Further, processor 304 is configured to segment each word of the plurality of words into one or more character segments (hereinafter referred to as "character segments") based on the number of characters indicated by the ground truth of the word. The segmentation of the word into the character segments represents boundaries for the character segments. In an embodiment, processor 304 is configured to segment a word by randomly dividing the word into character segments based on the number of characters indicated by the ground truth of the word. In another embodiment, processor 304 is configured to segment a word by dividing the word into character segments based on an average character width associated with each character in the word. The segmentation of each word of the plurality of words is explained in conjunction with FIG. 1.

Processor 304 is further configured to refine the segmentation of each word by iteratively re-segmenting each word by comparing character segments of each word in the plurality of words with one or more similar character segments (hereinafter referred to as "similar character segments"). The similar character segments may be selected by processor 304 from one or more of the plurality of words and a set of pre-saved character segments. To determine similar character segments, the ground truths of the character segments are compared with ground truths of other character segments in the plurality of words and in the set of pre-saved character segments. If two ground truths are identical, then the character segments associated with the two ground truths are considered to be similar character segments.

On comparing similar character segments, processor 304 refines segmentation of each character segment in each word of the plurality of words. To refine the segmentation of each word, processor 304 is configured to determine a plurality of horizontal boundaries and a plurality of vertical boundaries for the character segments of each word. The plurality of horizontal boundaries and the plurality of vertical boundaries are then iteratively modified by comparing the character segments with the similar character segments as explained in conjunction with FIG. 1 and FIG. 2a to FIG. 2c. In addition to defining horizontal boundaries and vertical boundaries, processor 304 is further configured to remove parts of one or more adjacent characters of the character segments to refine the segmentation of each word.

Further, the character segments associated with the plurality of words along with the similar character segments associated with the plurality of words may be stored in memory 302 and added to the set of pre-saved character segments. The set of pre-saved character segments may also be stored in memory 302. The character segments along with the similar character segments may be used for subsequent iterations for refining the segmentation of each word of the plurality of words.

Various embodiments of the invention provide methods and apparatuses for automatically identifying character segments for character recognition. The method and apparatus enables efficient segmentation of words that are in cursive script, such as words in Arabic script. The method enables automatically segmenting each word of a plurality of words into one or more character segments based on a word level or a line level ground truth. The segmentation of each word by iterative comparison eliminates the need for manually demarcating the segmentation of each word and hence reduces the error rate and time required for segmenting a word into character segments. Since, the ground truths are provided at a word level or a line level, manually providing ground truths for each character segment is also avoided. This reduces the time required for providing ground truths to train a classifier.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A method of automatically training an optical character recognition (OCR) classification engine to recognize script character segments, the method comprising:
    receiving a plurality of cursive script words and a ground truth corresponding to each cursive script word;
    performing an initial segmentation of each cursive script word into a number of character segments based on a number of characters indicated in the ground truth corresponding to each cursive script word;
    for each character segment in the number of character segments:
    comparing the ground truth of the character segment with ground truths of pre-saved character segments to find a matching ground truth;
    when the ground truth of the character segment matches a ground truth of one of the pre-saved character segments, then determining the character segment and the pre-saved character segment to be similar;
    refining a plurality of horizontal boundaries and a plurality of vertical boundaries of the character segment based on the similar pre-saved character segment to define a shape of the character segment and to eliminate a noise; and
    adding the character segment to the pre-saved character segments associated with the matching ground truth for subsequent recognition of an instance of the character segment.

2. The method of claim 1, wherein the plurality of cursive script words is a line of text.

3. The method of claim 1, wherein segmenting the cursive script word comprises at least one of:
    dividing the cursive script word into the at least one character segment randomly; and
    dividing the word into the at least one character segment based on a predefined average character width associated with each character of the plurality of cursive script words.

4. The method of claim 1, wherein refining the initial segmentation of each cursive script word into character segments comprises determining horizontal and vertical boundaries for each character segment in order to exclude a noise.

5. The method of claim 1, wherein refining the initial segmentation of each cursive script word comprises comparing each character segment with the at least one similar character segment, wherein a ground truth of the character segment and a ground truth of the at least one similar character segment are identical.

6. The method of claim 5, wherein the at least one similar character segment is selected from the plurality of cursive script words received.

7. The method of claim 5 further comprising storing at least one character segment and the at least one similar character segment in a tangible memory device.

8. The method of claim 1, wherein refining the initial segmentation of each cursive script word comprises removing at least one part of at least one adjacent character.

9. An apparatus for automatically training a classifier for character recognition of a script, the apparatus comprising:
    a memory; and
    a processor coupled to the memory, the processor configured to:
        receive a plurality of script words and a ground truth corresponding to each script word of the plurality of script words;
        initially segment each script word into a number of character segments based on a number of characters indicated by the ground truth corresponding to each script word;
    for each character segment in the number of character segments:
    comparing the ground truth of the character segment with ground truths of pre-saved character segments to find a matching ground truth;
    when the ground truth of the character segment matches a ground truth of one of the pre-saved character segments, then determining the character segment and the pre-saved character segment to be similar;
    refining a plurality of horizontal boundaries and a plurality of vertical boundaries of the character segment based on the similar pre-saved character segment to define a shape of the character segment and to eliminate a noise; and
    adding the character segment to the pre-saved character segments associated with the matching ground truth for subsequent recognition of an instance of the character segment.

10. The apparatus of claim 9, wherein the plurality of script words is a line of text.

11. The apparatus of claim 9, wherein the plurality of script words is in a cursive script.

12. The apparatus of claim 9, wherein the processor is further configured to refine the segmentation of each script word by determining horizontal and vertical boundaries for each character segment in order to exclude a noise.

13. The apparatus of claim 9, wherein the processor is further configured to refine the initial segmentation of each script word by comparing each character segment with the at least one similar character segment, wherein a ground truth of the character segment and a ground truth of the at least one similar character segment are identical.

14. The apparatus of claim 13, wherein the processor is further configured to select the at least one similar character segment from the plurality of script words received.

15. The apparatus of claim 13, wherein at least one character segment, the at least one similar character segment, and a set of pre-saved character segments is stored in the memory.

16. The apparatus of claim 9, wherein the processor is further configured to remove at least one part of at least one adjacent character.

* * * * *